(12) United States Patent
Nishimura et al.

(10) Patent No.: US 9,322,085 B2
(45) Date of Patent: Apr. 26, 2016

(54) HIGH-STRENGTH BRASS ALLOY FOR SLIDING MEMBERS, AND SLIDING MEMBERS

(75) Inventors: Shinya Nishimura, Fujisawa (JP); Tomoyuki Yamane, Fujisawa (JP); Takeshi Kondo, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 1019 days.

(21) Appl. No.: 13/142,502

(22) PCT Filed: Jan. 6, 2010

(86) PCT No.: PCT/JP2010/050297
§ 371 (c)(1),
(2), (4) Date: Jun. 28, 2011

(87) PCT Pub. No.: WO2010/079840
PCT Pub. Date: Jul. 15, 2010

(65) Prior Publication Data
US 2012/0020600 A1 Jan. 26, 2012

(30) Foreign Application Priority Data
Jan. 6, 2009 (JP) .................................. 2009-000951

(51) Int. Cl.
C22C 9/04 (2006.01)
C22C 30/06 (2006.01)
F16C 33/10 (2006.01)
F16C 33/12 (2006.01)

(52) U.S. Cl.
CPC .............. *C22C 9/04* (2013.01); *F16C 33/1095* (2013.01); *F16C 33/121* (2013.01); *C22C 30/06* (2013.01); *F16C 2202/52* (2013.01); *F16C 2204/14* (2013.01); *F16C 2204/50* (2013.01); *F16C 2240/40* (2013.01)

(58) Field of Classification Search
USPC ........................... 148/432–435; 420/475–482
See application file for complete search history.

(56) References Cited

U.S. PATENT DOCUMENTS

| 3,544,313 A | 12/1970 | Sadoshima et al. |
| 4,505,987 A * | 3/1985 | Yamada et al. ............... 428/553 |
| 4,676,848 A * | 6/1987 | Ruchel et al. .................. 148/434 |
| 4,851,191 A * | 7/1989 | Lee et al. ....................... 420/471 |
| 4,995,924 A * | 2/1991 | Akutsu .......................... 148/433 |

(Continued)

FOREIGN PATENT DOCUMENTS

| DE | 34 27 740 A1 | 2/1986 |
| DE | 10 2005 014 467 A1 | 10/2006 |

(Continued)

OTHER PUBLICATIONS

"Copper and copper alloy castings," *JIS H 5120*, 2009, pp. 1-23, published by the Japanese Standards Association in Japan.

(Continued)

*Primary Examiner* — Devang R Patel
(74) *Attorney, Agent, or Firm* — Oliff PLC

(57) ABSTRACT

A high-strength brass alloy for sliding members, consists of, by mass %, 17 to 28% of Zn, 5 to 10% of Al, 4 to 10% of Mn, 1 to 5% of Fe, 0.1 to 3% of Ni, 0.5 to 3% of Si, and the balance of Cu and inevitable impurities. The high-strength brass alloy has a structure that includes a matrix of a single phase structure of the β phase and includes at least one of Fe—Mn—Si intermetallic compounds in the form of aciculae, spheres, or petals dispersed in the β phase.

7 Claims, 4 Drawing Sheets

(56) References Cited

U.S. PATENT DOCUMENTS

| | | | |
|---|---|---|---|
| 5,000,915 A * | 3/1991 | Shirosaki et al. | 420/479 |
| 5,658,401 A * | 8/1997 | Gaag et al. | 148/434 |
| 6,071,361 A * | 6/2000 | Sato et al. | 148/516 |
| 6,790,297 B1 * | 9/2004 | Ueda et al. | 148/432 |
| 2007/0227631 A1 * | 10/2007 | Gaag et al. | 148/434 |
| 2008/0219881 A1 | 9/2008 | Gaag | |
| 2008/0240973 A1 | 10/2008 | Gaag et al. | |

FOREIGN PATENT DOCUMENTS

| | | |
|---|---|---|
| EP | 0 614 026 A1 | 9/1994 |
| EP | 0 657 555 A1 | 6/1995 |
| JP | B-51-41569 | 11/1976 |
| JP | A-60-114545 | 6/1985 |
| JP | S60-174842 A | 9/1985 |
| JP | A-62-250138 | 10/1987 |
| JP | B2-62-57700 | 12/1987 |
| JP | A-11-166539 | 6/1999 |
| JP | A-2008-534780 | 8/2008 |
| WO | WO 2007/068368 A1 | 6/2007 |

OTHER PUBLICATIONS

International Search Report issued in International Application No. PCT/JP2010/050297 on Apr. 20, 2010 (with translation).
Oct. 10, 2013 Extended European Search Report issued in European Application No. 10729258.3.
Jan. 21, 2016 Communication of a Notice of Opposition issued in European Patent Application No. 107292583.
Dec. 8, 2015 Notice of Opposition issued in European U.S. Pat. No. 2 386 664.
Dec. 18, 2015 Notice of Opposition issued in European U.S. Pat. No. 2 386 644.
Mar. 2007 Edition of German Copper Institute, "Copper Zinc Alloys (Brass and Special Brass)," Information Print i.5.
Dies, Kurt, "Copper and Copper Alloys in Technology," Springer, 1967, pp, 255-385.
Schumann, Hermann, "Metallography," 13th Edition, Leipzig, German publishing house for primary industry, 1990, p. 643.
D19, First calculation example 1.
D20, Second calculation example 2.

* cited by examiner 200-times magnification 450-times magnification 200-times magnification 450-times magnification Fig. 3A
Fig. 3B
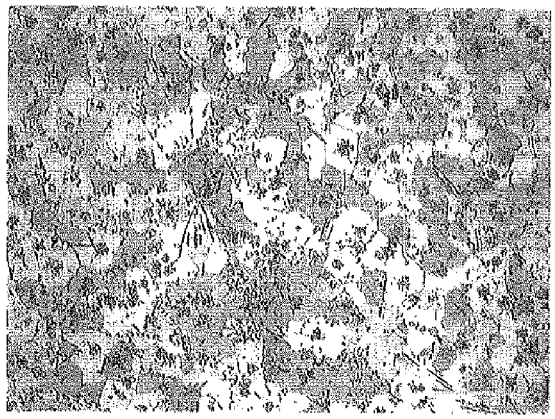
200-times magnification
450-times magnification
Fig. 4
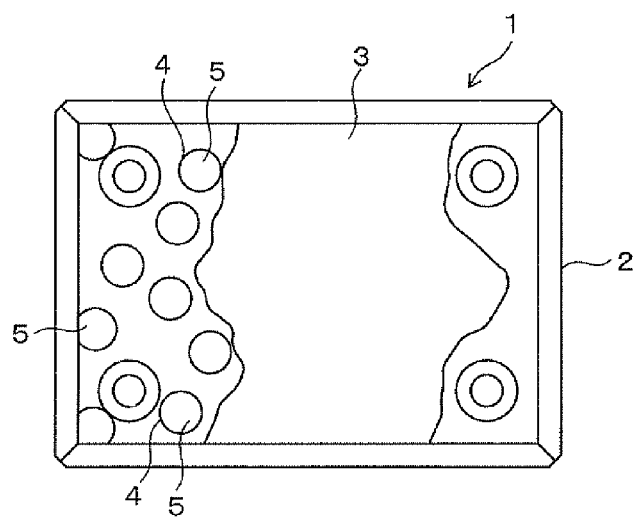

HIGH-STRENGTH BRASS ALLOY FOR SLIDING MEMBERS, AND SLIDING MEMBERS

TECHNICAL FIELD

The present invention relates to a high-strength brass alloy having superior wear resistance. Specifically, the present invention relates to a high-strength brass alloy which may be suitably used for sliding members such as sliding bearings and sliding plates. The present invention also relates to sliding members using the high-strength brass alloy.

BACKGROUND ART

High-strength brass alloys are conventionally used for sliding members such as bearings, and first to fourth class high-strength brass castings specified in Japanese Industrial Standards JIS H5120 have been used. These high-strength brass alloys are made by adding Al, Fe, Mn, etc., to Cu—Zn alloys, whereby seawater resistance, toughness, wear resistance, and hardness are improved. Therefore, these high-strength brass alloys are widely used as sliding members such as synchronizer rings for transmission systems of automobiles, gear wheels for general machinery, and bearings.

The high-strength brass alloy has a matrix that may exhibit various phases such as a α phase, β phase, α+β phase, and γ phase, according to the total amount of added elements which are weighed by zinc equivalent (hereinafter called "amount corresponding to zinc equivalent"). If the amount corresponding to the zinc equivalent is small, the matrix exhibits the α phase. A high-strength brass alloy exhibiting the α phase has superior toughness but has low hardness. Therefore, when this high-strength brass alloy is used for sliding members, abrasive wear occurs easily. If the amount corresponding to the zinc equivalent is increased, the matrix exhibits the β phase. Moreover, if the amount corresponding to the zinc equivalent is further increased, the matrix exhibits the γ phase. In a high-strength brass alloy exhibiting the γ phase, hardness is increased and wear resistance is improved, whereas toughness is greatly decreased and shock resistance is decreased.

Accordingly, a high-strength brass alloy having a matrix made of a single structure of the β phase is widely used for sliding members because toughness is not decreased and wear resistance is superior. Nevertheless, in accordance with recent tendency to increase efficiency and prolong the life of mechanical devices, further improvement of wear resistance is required for sliding members made of high-strength brass alloy.

In order to improve wear resistance of a high-strength brass alloy having a matrix made of a α+β phase or a β phase structure, the following high-strength brass alloys are suggested. Japanese Examined Patent Publication No. 51-041569 discloses a high-strength brass alloy in which intermetallic compounds of manganese silicide system such as $Mn_5Si_3$ are dispersed in a matrix. In addition, Japanese Examined Patent Publications Nos. 62-057700 and 2-038651 disclose high-strength brass alloys in which Fe—Mn—Si intermetallic compounds are dispersed in a matrix.

It is known that wear resistance can be improved by dispersing the intermetallic compounds of a manganese silicide system or a Fe—Mn—Si system in a matrix. In this case, the zinc equivalent of Si is 10 and is very high in the elements added in a high-strength brass alloy. Therefore, the amount corresponding to the zinc equivalent is increased by adding Si. Accordingly, in order to maintain the matrix to be a single structure of the β phase, the amounts of the other elements should be limited. As one of the other elements, for example, Al is known. Al is an element for improving corrosion resistance and strengthening the matrix. Therefore, by dispersing Fe—Mn—Si intermetallic compounds in the matrix that is hardened by Al, wear resistance is further improved. However, the zinc equivalent of Al is 6 and is very high. If Si and Al are added, the amount corresponding to the zinc equivalent is increased, and the γ phase is generated in the matrix. As a result, wear resistance is improved, but elongation is greatly decreased. Therefore, when Si is added so as to improve wear resistance, the amount of Al must be decreased. Accordingly, it is difficult to further improve wear resistance while the matrix is maintained to be a single structure of the β phase.

DISCLOSURE OF THE INVENTION

An object of the present invention is to provide a high-strength brass alloy for sliding members, which has superior wear resistance, and to provide sliding members. The high-strength brass alloy has a matrix that is maintained to be a single phase structure of the β phase by decreasing the amount of Si solid-solved therein to approximately the zero level. The matrix has a structure in which Fe—Mn—Si intermetallic compounds are dispersed in the β phase.

In view of the above circumstances, the present inventors conducted intensive research. The present inventors focused on Mn that has a zinc equivalent of 0.5, which is the smallest zinc equivalent in the composition elements. As a result, the inventors have found that the amount corresponding to the zinc equivalent is not increased even when a large amount of Mn is added. Moreover, in this case, Si is also added, but the ratio of Si with respect to the amount corresponding to the zinc equivalent can be substantially at the zero level. That is, the present inventors found the following. In order to form Fe—Mn—Si intermetallic compounds in a matrix since these are effective for improving wear resistance, Si is added while the amount of Mn and the amount of Fe are increased. Then, by precipitating most of Si as Fe—Mn—Si intermetallic compounds so as to decrease the solid solution of Si into the matrix to approximately the zero level, the effect of Si on the matrix is decreased. As a result, Al having large zinc equivalent can be added while the matrix is maintained to be a single phase structure of the β phase.

The high-strength brass alloy for sliding members of the present invention is achieved based on the above findings. The present invention provides a high-strength brass alloy for sliding members, and the high-strength brass alloy consists of, by mass %, 17 to 28% of Zn, 5 to 10% of Al, 4 to 10% of Mn, 1 to 5% of Fe, 0.1 to 3% of Ni, 0.5 to 3% of Si, and the balance of Cu and inevitable impurities. The high-strength brass alloy has a structure that includes a matrix of a single phase structure of the β phase and includes at least one of Fe—Mn—Si intermetallic compounds in the form of acicuiae, spheres, or petals dispersed in the β phase.

The high-strength brass alloy of the present invention consists of, by mass %, 17 to 28% of Zn, 5 to 10% of Al, 4 to 10% of Mn, 1 to 5% of Fe, 0.1 to 3% of Ni, 0.5 to 3% of Si, and the balance of Cu and inevitable impurities. Hereinafter, the element compositions of the high-strength brass alloy of the present invention are described.

Zn improves strength of the matrix, wear resistance, shock resistance, and corrosion resistance to lubricant, and also Zn affects the structure of the matrix. According to the amount of Zn, phases such as the α phase, β phase, and γ phase are generated in the structure of the matrix. The necessary amount of Zn depends on the zinc equivalents of the other elements and the amounts thereof. When the amount of Zn is less than 17 mass %, the α phase is generated in the structure of the matrix, whereby wear resistance is decreased. On the other hand, when the amount of Zn is more than 28 mass %, the γ phase is generated in the structure of the matrix, whereby the alloy is embrittled. Therefore, the amount of Zn is set to be 17 to 28 mass %.

Al facilitates generation of the β phase and is effective for strengthening the matrix. On the other hand, Al has large zinc equivalent and facilitates generation of the γ phase, which is similar to the case of Si. When the amount of Al is less than 5 mass %, sufficient hardness required for wear resistance is not obtained. On the other hand, when the amount of Al is more than 10 mass %, the γ phase is generated and thereby the alloy is embrittled. Therefore, the amount of Al is set to be 5 to 10 mass %.

Mn combines with Fe and Si, which will be described later, and Mn precipitates Fe—Mn—Si intermetallic compounds. Therefore, Mn improves wear resistance and decreases the solid solution of single Si into the matrix to approximately the zero level by combining with Si. Accordingly, a large amount of Mn is required. When the amount of Mn is less than 4 mass %, the above effects are not sufficiently obtained. On the other hand, when the amount of Mn is greater than 10 mass %, the above effects are not greatly increased. Therefore, the amount of Mn is set to be 4 to 10 mass %.

Fe combines with Mn and Si and precipitates Fe—Mn—Si intermetallic compounds, thereby improving wear resistance. When the amount of Fe is less than 1 mass %, the above effect is not sufficiently obtained. On the other hand, when the amount of Fe is more than 5 mass %, the above effect is not greatly increased. Therefore, the amount of Fe is set to be 1 to 5 mass %.

Ni is solid solved into the matrix and improves the strength and the toughness of the alloy. Moreover, Ni combines with Si and Zn and forms fine intermetallic compounds of Ni system dispersed in the matrix, thereby improving wear resistance. When the amount of Ni is less than 0.1 mass %, the above effects are not sufficiently obtained. On the other hand, since Ni has negative zinc equivalent, the amount of Ni is required to be not more than 3 mass % so as to obtain a single phase structure of the β phase. Therefore, the amount of Ni is set to be 0.1 to 3 mass %.

Si combines with Fe and Mn and precipitates Fe—Mn—Si intermetallic compounds, thereby improving wear resistance. Moreover, by decreasing the solid solution of Si into the matrix to approximately the zero level by Mn and Fe which are added at the same time, generation of the γ phase in the matrix is prevented. In order to obtain a necessary amount of the Fe—Mn—Si intermetallic compounds, the amount of Si is required to be not less than 0.5 mass %. On the other hand, when the amount of Si is more than 3 mass %, the amount of solid solution of Si into the matrix is increased, and the γ phase is generated. Therefore, the amount of Si is set to be 0.5 to 3 mass %.

In the high-strength brass alloy of the present invention, the form of the Fe—Mn—Si intermetallic compounds is at least one of aciculae, spheres, and petals. FIG. 1A is an optical micrograph at 200-times magnification showing a structure of a high-strength brass alloy, and FIG. 1B is an optical micrograph at 450-times magnification showing the structure of the high-strength brass alloy. This high-strength brass alloy consists of 25.90 mass % of Zn, 5.67 mass % of Al, 5.95 mass % of Mn, 2.00 mass % of Fe, 2.32 mass % of Ni, 1.45 mass % of Si, and the balance of Cu and inevitable impurities, and was obtained by sand casting. As shown in FIGS. 1A and 1B, the portions in the form of aciculae, spheres, or petals are the Fe—Mn—Si intermetallic compounds. The Fe—Mn—Si intermetallic compounds are dispersed in the single structure of the β phase at 5.7% area ratio.

FIG. 2A is an optical micrograph at 200-times magnification showing a structure of a high-strength brass alloy, and FIG. 2B is an optical micrograph at 450-times magnification showing the structure of the high-strength brass alloy. This high-strength brass alloy consists of 20.46 mass % of Zn, 5.66 mass % of Al, 5.93 mass % of Mn, 2.75 mass % of Fe, 2.52 mass % of Ni, 1.48 mass % of Si, and the balance of Cu and inevitable impurities, and was obtained by sand casting. As shown in FIGS. 2A and 2B, the portions in the form of aciculae, spheres, or petals are the Fe—Mn—Si intermetallic compounds. The Fe—Mn—Si intermetallic compounds are dispersed in the single structure of the β phase at 8.8% area ratio.

FIG. 3A is an optical micrograph at 200-times magnification showing a structure of a high-strength brass alloy, and FIG. 3B is an optical micrograph at 450-times magnification showing the structure of the high-strength brass alloy. This high-strength brass alloy consists of 16.98 mass % of Zn, 6.63 mass % of Al, 7.75 mass % of Mn, 2.91 mass % of Fe, 1.96 mass % of Ni, 1.49 mass % of Si, and the balance of Cu and inevitable impurities, and was obtained by sand casting. As shown in FIGS. 3A and 3B, the portions in the form of aciculae, spheres, or petals are the Fe—Mn—Si intermetallic compounds. The Fe—Mn—Si intermetallic compounds are dispersed in the single structure of the β phase at 12.9% area ratio.

In the high-strength brass alloy of the present invention, the amounts of Mn and Fe are greater than that of Si. Therefore, Si having large zinc equivalent is used for formation of the Fe—Mn—Si intermetallic compounds, whereby the amount of Si solid solved in the matrix can be decreased. Therefore, increase of the amount corresponding to the zinc equivalent in the matrix is prevented, and the amount of Al is freely selected.

Effect of the Invention

In the present invention, the matrix is strengthened by Al and exhibits a single structure of the β phase. The matrix exhibits a structure in which hard Fe—Mn—Si intermetallic compounds are dispersed in the β phase that is hardened by Al. Accordingly, hardness and tensile strength are increased, whereby wear resistance is further improved. Moreover, toughness is improved, and a certain amount of elongation is obtained.

BRIEF DESCRIPTION OF THE DRAWINGS

FIGS. 3A and 3B are optical micrographs showing a structure of the other high-strength brass alloy in an embodiment of the present invention.

FIG. 4 is a top view of a plate-shaped sliding member in an embodiment of the present invention.

EXPLANATION OF REFERENCE NUMERALS

Figure 1A:
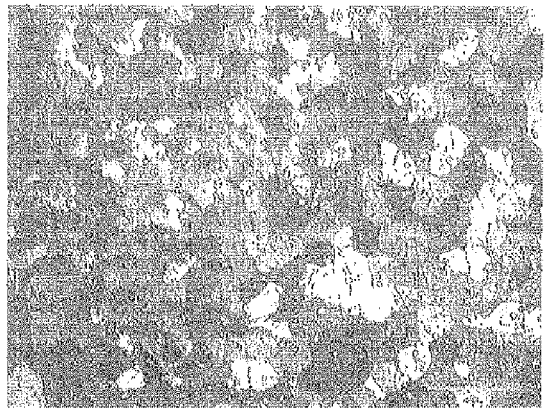
FIGS. 1A and 1B are optical micrographs showing a structure of a high-strength brass alloy in an embodiment of the present invention.
Figure 1B:
Figure 2A:
FIGS. 2A and 2B are optical micrographs showing a structure of another high-strength brass alloy in an embodiment of the present invention.
Figure 2B:

1, 1a, and 1b denote a sliding member, and 2, 2a, and 2b denote a main body of a sliding member.

BEST MODE FOR CARRYING OUT THE INVENTION

Embodiments of the present invention will be described in more detail. It should be noted that the present invention is not limited by these embodiments.

In the high-strength brass alloy of the present invention, the Fe—Mn—Si intermetallic compounds are dispersed in the single structure of the β phase of the matrix. These intermetallic compounds have at least one form of aciculae, spheres, and petals, as shown in the micrographs of the structure of the optical microscopy in FIGS. 1A to 3B. The Fe—Mn—Si intermetallic compounds are hard. The area ratio of the Fe—Mn—Si intermetallic compounds dispersed in the single structure of the β phase of the matrix is approximately proportional to the wear resistance of the high-strength brass alloy. When the Fe—Mn—Si intermetallic compounds are dispersed in the single structure of the β phase of the matrix in a small amount, for example, at 3% area ratio, the effect for improving the wear resistance of the high-strength brass alloy is exhibited. This effect is obtained until the area ratio of the Fe—Mn—Si intermetallic compounds is 20%. On the other hand, when the area ratio of the Fe—Mn—Si intermetallic compounds dispersed in the single phase structure of the β phase of the matrix is greater than 20%, the wear resistance of the high-strength brass alloy is increased, but the ratio of wear of a mating material is increased. Moreover, the mechanical characteristics, especially, elongation, may be greatly decreased. Therefore, the area ratio of the Fe—Mn—Si intermetallic compounds dispersed in the single phase structure of the β phase of the matrix is preferably 3 to 20%, and is more preferably 5 to 15%.

In the high-strength brass alloy of the present invention, when the mass percentages of Fe, Mn, and Si are expressed as [Fe], [Mn], and [Si], respectively, the following first formula is desirably satisfied.

First Formula $$0.31 \times [Mn] + 0.17 \times [Fe] \geq [Si] \quad (1)$$

The above formula was derived based on the following idea. That is, $Mn_5Si_3$ and $Fe_3Si$ are known as typical intermetallic compounds. In assuming that these intermetallic compounds are generated, amounts of Mn and Fe required to use the entire amount of Si are calculated from the atomic weights. When the mass of a Si atom is expressed as 1, the mass of Mn is expressed as 54.94 (atomic weight of Mn)/28.09 (atomic weight of Si)=1.956, and the mass of Fe is expressed as 55.85 (atomic weight of Fe)/28.09=1.988. The amount of Mn required for using Si in the form of $Mn_5Si_3$ is 1.956×5/3=3.26 (inverse number is 0.31). The amount of Fe required for using Si in the form of $Fe_3Si$ is 1.988×3=5.964 (inverse number is 0.17). Accordingly, the above formula can be derived.

By setting the amounts of Fe, Mn, and Si so as to satisfy the above formula, the solid solution of Si into the single phase structure of the β phase of the matrix can be decreased to approximately the zero level. Therefore, generation of the γ phase in the matrix is prevented. As a result, Si and Al can be added at the same time, whereby the wear resistance is improved due to precipitation of the Fe—Mn—Si intermetallic compounds.

The high-strength brass alloy of the present invention may be casted into a plate shape so as to form a plate-shaped body with a sliding surface at the surface. Then, plural holes or plural grooves are formed on the sliding surface of the plate-shaped body, and solid lubricant such as graphite is buried and is fixed in the holes or the grooves. Accordingly, a solid lubricant-buried sliding member is obtained.

FIG. 4 is a top view showing a sliding member (sliding plate) 1 in the form of plate shape using the high-strength brass alloy of the present invention. This sliding member 1 made of the high-strength brass alloy includes a main body 2 having a surface (sliding surface) 3 at one side. The surface 3 is formed with plural recesses 4 that are recessed in the thickness direction of the main body 2. The recesses 4 are formed so that the total of the area of the opening portion is 10 to 40% with respect to the area of the surface 3 of the main body 2 of the sliding member 1. The recesses 4 are for containing and maintaining solid lubricant 5 such as graphite. The total of the area of the opening portion of the recesses 4 is required to be at least 10% with respect to the area of the surface 3 of the main body 2 in order to effectively obtain wear resistance of the sliding member 1. On the other hand, when the total of the area of the opening portion of the recesses 4 is more than 40% with respect to the area of the surface 3 of the main body 2 of the sliding member 1, the strength of the main body 2 of the sliding member 1 is decreased. The recesses 4 are formed by hole machining or cutting work with a drill, an endmill, or the like, or may be formed by the other means.

In another case, the high-strength brass alloy of the present invention may be casted into a cylindrical shape so as to form a cylindrical body with a sliding surface at least at an inner circumferential surface. Then, plural holes or plural grooves are formed at least on the inner circumferential surface, and solid lubricant such as graphite is buried and is fixed in the holes or the grooves. Accordingly, a solid lubricant-buried sliding member is obtained.

Figure 5:
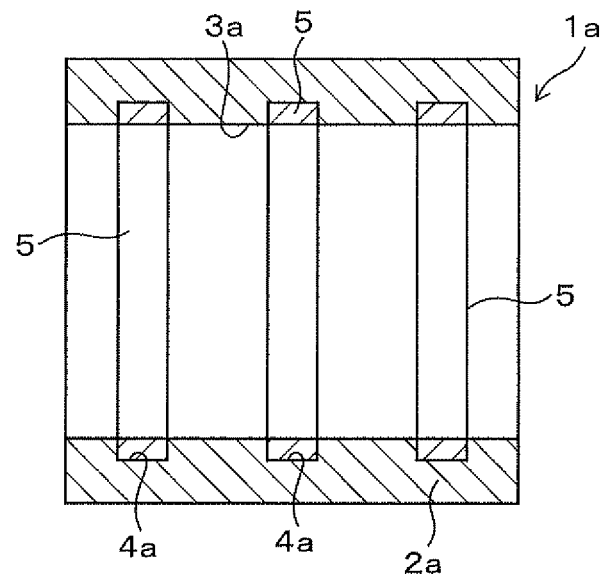
FIG. 5 is a cross sectional view of a cylindrical sliding member in an embodiment of the present invention.

FIG. 5 is a cross sectional view showing a sliding member (cylindrical bearing) 1a in the form of a cylindrical bush using the high-strength brass alloy of the present invention. This sliding member 1a made of the high-strength brass alloy includes a main body 2a having an inner circumferential surface (sliding surface) 3a. The inner circumferential surface 3a is formed with plural ring-shaped grooves 4a that are arranged in the longitudinal direction of the main body 2a. The grooves 4a are formed so that the total of the area of the opening portion is 10 to 40% with respect to the area of the inner circumferential surface 3a of the main body 2a of the sliding member 1a, which is the same as the case of the sliding member 1. The grooves 4a are formed by cutting work with a bit or the like, or may be formed by the other means.

Figure 6:
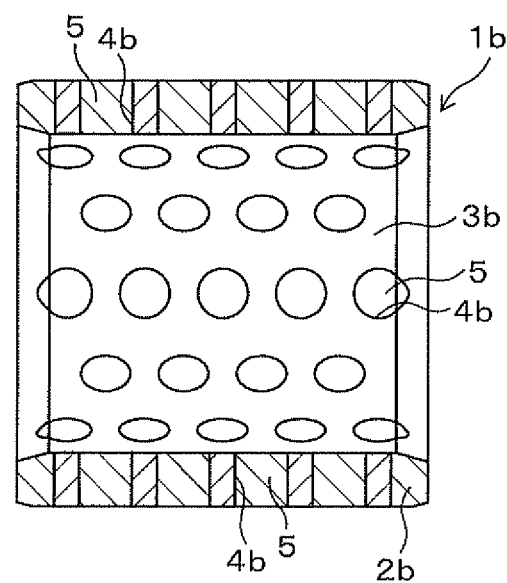
FIG. 6 is a cross sectional view of the other example of a cylindrical sliding member in an embodiment of the present invention.
Figure 7:
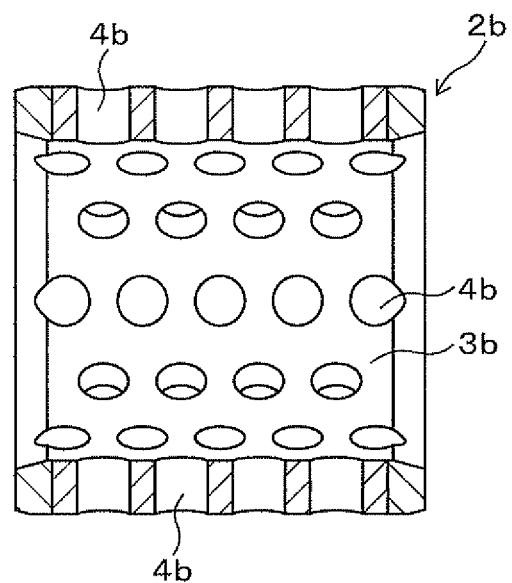
FIG. 7 is a cross sectional view of a main body of the cylindrical sliding member shown in FIG. 6.

FIG. 6 is a cross sectional view showing a sliding member 1b in the form of a cylindrical bush using the high-strength brass alloy of the present invention. The sliding member 1b is structured such that a cylindrical main body 2b made of the high-strength brass alloy, and plural columnar holes 4b communicating with an inner circumferential surface (sliding surface) 3b and an outer circumferential surface, are formed as shown in FIG. 7. In addition, the holes 4b are filled with solid lubricant 5. The holes 4b are formed so that the total of the area of the opening portion is 10 to 40% with respect to the area of the inner circumferential surface 3b of the main body 2b of the sliding member 1b, which is the same as the case of the sliding member 1. The holes 4b are formed by hole machining with a drill or the like, or may be formed by the other means.

EXAMPLES

The present invention will be described in detail based on Examples. It should be noted that the present invention is not limited by the following practical examples.

Practical Examples 1 to 6 and Comparative Examples 1 to 5

First, Cu, Zn, Al, Cu—Fe based alloy, Ni—Al based alloy, Si—Cu based alloy, Mn—Cu based alloy, and Fe—Al based alloy were melted in a low frequency melting furnace so as to form chemical compositions shown in Table 1. Then, the melted metals were casted in a sand mold with an inner diameter of 50 mm, outer diameter of 80 mm, and length of 100 mm at a temperature of 1100° C. or more, whereby a cylindrical body was formed. The cylindrical body was machined into a cylindrical bearing with an inner diameter of 60 mm, outer diameter of 75 mm, and length of 50 mm. Moreover, plural penetrating holes with a diameter of 10 mm were formed on the inner circumferential surface in the thickness direction of the cylindrical bearing so that the opening area was 30% with respect to the area of the inner circumferential surface. In addition, solid lubricant made of graphite was buried into the penetrating holes. Next, lubricant oil was vacuum impregnated to the part of the solid lubricant, whereby test pieces for wear test were obtained. Test pieces for tensile test were prepared as follows. The melted metal was casted in accordance with JIS H5120B and then machined into a shape of test piece No. 4 specified by JIS Z2201 (specified for tensile test piece of metal material). Then, tensile test was performed in accordance with JIS Z2241 (specified for tensile test method of metal material). Hardness (Brinell hardness) was measured by using the test piece No. 4. Table 1 shows area ratio of intermetallic compounds (%) which is an area ratio of Fe—Mn—Si intermetallic compounds dispersed in a matrix.

Figure 8:
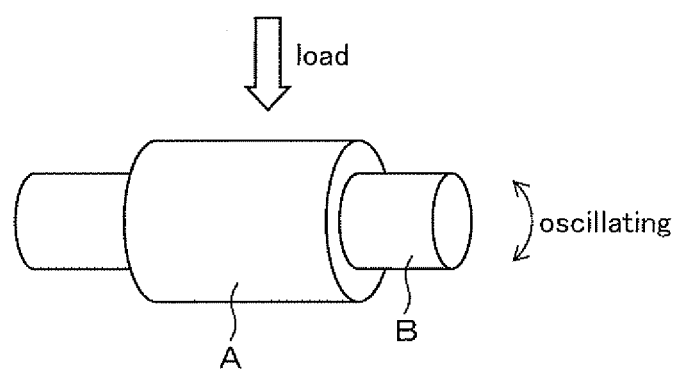
FIG. 8 is an oblique view showing a test method of wear amount in the examples.

Table 2 shows mechanical characteristics and wear amount of the practical examples and the Comparative Examples. The wear amount shown in Table 2 is a result of a journal oscillating test that is schematically shown in FIG. 8. The journal oscillating test was performed such that a rotating shaft (mating material) B was oscillatory rotated with respect to the cylindrical bearing A of the practical examples and the Comparative Examples. In this case, the cylindrical bearing A was applied with load and was fixed, and the rotating shaft B was oscillatory rotated at a predetermined sliding rate. Then, the wear amounts of the cylindrical bearing A and the rotating shaft B were measured after predetermined testing time. The test conditions were as follows.

Test Conditions

| | |
|---|---|
| Sliding Rate | 0.47 m/min |
| Surface Pressure | 1000 kgf/cm$^2$ (98 MPa) |
| Test Time | 100 hours |
| Movement Form | Continuous oscillating movement of rotating shaft |
| Oscillating Angle | ±45 degrees |

Material of Mating Member
  Carbon steel for machine structural purposes (S45C) specified by the Japanese Industrial Standards
  Sliding Condition Lithium series grease was applied on the sliding surface when the test was started

TABLE 1

| | | Chemical Composition (mass %) | | | | | | | Area Ratio of Intermetallic |
|---|---|---|---|---|---|---|---|---|---|
| | | Cu | Zn | Mn | Fe | Al | Ni | Si | Matrix | Compounds (%) |
| Practical Example | 1 | Balance | 17.13 | 5.36 | 1.23 | 8.99 | 2.93 | 0.73 | β phase | 3.2 |
| | 2 | Balance | 25.90 | 5.95 | 2.00 | 5.67 | 2.32 | 1.45 | β phase | 5.7 |
| | 3 | Balance | 23.56 | 6.13 | 2.64 | 5.25 | 2.30 | 1.53 | β phase | 7.9 |
| | 4 | Balance | 20.46 | 5.93 | 2.75 | 5.66 | 2.52 | 1.48 | β phase | 8.8 |
| | 5 | Balance | 16.98 | 7.75 | 2.91 | 6.63 | 1.96 | 1.49 | β phase | 12.9 |
| | 6 | Balance | 17.32 | 9.83 | 4.82 | 5.80 | 2.51 | 2.82 | β phase | 14.8 |
| Comparative Example | 1 | Balance | 23.20 | 2.98 | 3.05 | 6.07 | 1.51 | 0.09 | β phase | * |
| | 2 | Balance | 24.30 | 3.30 | 1.30 | 6.32 | 2.73 | 2.56 | β + γ phase | 2.1 |
| | 3 | Balance | 15.03 | 6.06 | 3.09 | 5.98 | 2.03 | 1.47 | α + β phase | 3.2 |
| | 4 | Balance | 21.03 | 4.67 | 2.94 | 5.23 | 3.23 | 1.03 | α + β phase | 0.8 |
| | 5 | Balance | 17.20 | 11.35 | 4.21 | 6.32 | 2.80 | 2.65 | β phase | 21.2 |

Note
The mark of asterisk shown in the section of the area ratio of intermetallic compounds of the comparative example 1 in Table 1, the intermetallic compounds were Fe—Cu—Al system and the area ratio thereof dispersed in the β phase was 4%.

TABLE 2

| | | Brinell Hardness (HB) | Tensile Strength (MPa) | Elongation (%) | Wear Amount (μm) | |
|---|---|---|---|---|---|---|
| | | | | | Bearing | Mating Material |
| Practical Example | 1 | 265 | 755 | 7.3 | 20 | 1 |
| | 2 | 281 | 780 | 4.2 | 15 | 2 |
| | 3 | 286 | 819 | 3.6 | 14 | 4 |
| | 4 | 293 | 841 | 2.3 | 12 | 4 |
| | 5 | 303 | 912 | 0.8 | 10 | 8 |
| | 6 | 310 | 921 | 0.6 | 8 | 14 |
| Comparative Example | 1 | 235 | 785 | 10 | 63 | 0 |
| | 2 | 284 | 610 | 0.1 | 51 | 4 |
| | 3 | 234 | 585 | 3.2 | 182 | 4 |
| | 4 | 210 | 637 | 11.3 | 243 | 2 |
| | 5 | 311 | 821 | 0.1 | 10 | 38 |

The high-strength brass alloys of the practical examples of the present invention had a matrix of single phase structure of the β phase. By decreasing the solid solution of Si into the matrix to approximately the zero level, the effect of Si on the matrix was decreased, and the matrix was made to be a single phase structure of the β phase. In addition, the matrix exhibited a structure in which the Fe—Mn—Si intermetallic compounds were dispersed in the β phase. Therefore, the high-strength brass alloys of the practical examples were superior in the wear resistance and the mechanical characteristics. In the solid-lubricant buried sliding members in which the solid lubricant was buried in the high-strength brass alloy, wear resistance was superior due to the high-strength brass alloy of the base metal, and frictional properties were low due to the solid lubricant. Accordingly, superior wear resistance as a bearing was obtained.

On the other hand, in the high-strength brass alloy of the Comparative Example 1, the matrix exhibited a single phase structure of the β phase, but the intermetallic compounds dispersed in the β phase were Fe—Cu—Al intermetallic compounds. In this case, in the sliding member in which the solid-lubricant was buried, the wear amount was increased, and the wear resistance was inferior. In the high-strength brass alloy of the Comparative Example 2, the amount of Mn was low, whereby an extra amount of Si was solid solved in the matrix and the structure of the matrix exhibited a β+γ phase. As a result, the elongation was greatly decreased. In the sliding member in which the solid lubricant was buried in the Comparative Example 2, the wear amount was increased and the wear resistance was inferior. In the high-strength brass alloy of the Comparative Example 3, the amount of Zn was small. In the high-strength brass alloy of the Comparative Example 4, the amount of Ni that has negative zinc equivalent was large. Accordingly, in the high-strength brass alloys of the Comparative Example 3 and 4, the α phase was generated in the β phase, whereby the wear resistance was greatly decreased. Moreover, in the high-strength brass alloy of the Comparative Example 5, the amount of Mn was large, and the matrix was a single phase structure of the β phase, but the area ratio of the intermetallic compounds was more than 20%. Therefore, the elongation of the mechanical characteristics was greatly decreased. In addition, in the sliding member in which the solid lubricant was buried in the Comparative Example 5, the wear amount of the mating member was extremely increased.

INDUSTRIAL APPLICABILITY

As described above, the high-strength brass alloy of the present invention has a structure which includes a matrix of a single phase structure of the β phase and includes the hard Fe—Mn—Si intermetallic compounds dispersed in the β phase at a predetermined area ratio. Therefore, the hardness and the tensile strength are increased, whereby the wear resistance is improved. Moreover, a predetermined amount of elongation can be obtained. Accordingly, the high-strength brass alloy of the present invention can be used for sliding members such as sliding bearings, washers, sliding plates, etc.

The invention claimed is:

1. A high-strength brass alloy for sliding members, the high-strength brass alloy consisting of, by mass %, 17 to 28% of Zn, 5 to 10% of Al, 4 to 10% of Mn, 1 to 5% of Fe, 2.3 to 3% of Ni, 0.5 to 3% of Si, and the balance of Cu and inevitable impurities, and
the high-strength brass alloy having only a structure that consists of: (i) a matrix of a single phase structure of a β phase, and (ii) at least one of Fe—Mn—Si intermetallic compounds in the form of aciculae, spheres, or petals dispersed in the β phase,
wherein when the mass percentages of Fe, Mn, and Si are represented as [Fe], [Mn], and [Si], respectively, the following first formula is satisfied:

$$0.31 \times [Mn] + 0.17 \times [Fe] \geq [Si]. \tag{1}$$

2. The high-strength brass alloy for sliding members according to claim 1, wherein the Fe—Mn—Si intermetallic compounds are dispersed in the single phase structure of the phase at an area ratio of 3 to 20%.

3. A sliding member comprising:
a composition made of the high-strength brass alloy as recited in claim 1, and
a cylindrical body with a sliding surface having at least at an inner circumferential surface,
wherein plural holes or plural grooves are formed at least on the inner circumferential surface, and solid lubricant is buried and fixed in the plural holes or the plural grooves.

4. A sliding member comprising:
a composition made of the high-strength brass alloy as recited in claim 1, and
a plate-shaped body with a sliding surface,
wherein plural holes, plural grooves, or plural recesses are formed on the sliding surface, and solid lubricant is buried and fixed in the plural holes, the plural grooves, or the plural recesses.

5. The sliding member according to claim 3, wherein an area ratio of the solid lubricant is 10 to 40% with respect to the inner circumferential surface or the sliding surface.

6. The sliding member according to claim 4, wherein an area ratio of the solid lubricant is 10 to 40% with respect to the inner circumferential surface or the sliding surface.

7. The sliding member according to claim 3, wherein the Fe—Mn—Si intermetallic compounds disperse in the matrix of the single phase structure of the β phase at an area ratio of 3.2 to 8.8%, and the sliding member has an elongation of 2.3 to 7.3%.

* * * * *